April 15, 1924.

A. J. H. ELVERSON 1,490,603

METHOD AND APPARATUS FOR TESTING FRICTION BETWEEN SURFACES

Filed March 20, 1923

Inventor:
Arthur John Hawes Elverson.

by Munn &co,
Attys.

Patented Apr. 15, 1924.

1,490,603

UNITED STATES PATENT OFFICE.

ARTHUR JOHN HAWES ELVERSON, OF LONDON, ENGLAND.

METHOD AND APPARATUS FOR TESTING FRICTION BETWEEN SURFACES.

Application filed March 20, 1923. Serial No. 626,350.

*To all whom it may concern:*

Be it known that I, ARTHUR JOHN HAWES ELVERSON, a British subject, residing at The Lynch, Clifton Road, Wimbledon, London, S. W., England, have invented certain new and useful Improvements in Methods and Apparatus for Testing Friction Between Surfaces, of which the following is a specification.

This invention relates to apparatus for testing the friction between dry surfaces or between lubricated surfaces and has for its object to provide an improved method and apparatus for enabling tests to be made at high speeds and under working conditions.

In the method of testing employed in accordance with the present invention the slip between two rotating or reciprocating surfaces in contact, one surface being driven from the other is ascertained by means of stroboscopic apparatus the flashing means for which are timed synchronously with one of the surfaces so that the slip becomes visible by the apparent departure of one of the surfaces from its apparently stationary position; alternatively the flashes may be timed slightly asynchronously to render visible the slip by the relative movement of the surfaces apparently moving at reduced speed.

The two surfaces preferably take the form of rotating discs with prepared surfaces which are pressed together by a predetermined force. One of these discs (the driven disc) is connected to a suitable form of dynamometer and the other (the driving disc) coupled to a suitable prime mover at a speed which can readily be ascertained and varied.

The stroboscope flashes are made to synchronize in period with that of the driving disc so that the latter appears to be stationary or to differ in period by a small amount so that the shaft appears to rotate at slow speed. When the friction between the two discs reaches its limiting value slip will occur and this will immediately be discernible by their relative movement as revealed by the stroboscope.

When the apparatus is employed for measuring the coefficient of friction between dry surfaces of given materials, these materials are mounted upon the discs.

When the apparatus is employed for testing lubricants between prepared surfaces of given materials the lubricant is applied between the prepared faces of the discs or prepared surfaces attached thereto. Means may be provided for delivering lubricant between the surfaces at any suitable rate of flow, temperature and pressure.

Measurements of comparative viscosity can be deduced from readings taken by the method of the present invention.

In the accompanying drawings I will illustrate one form of apparatus for carrying out the invention.

Figure 1:
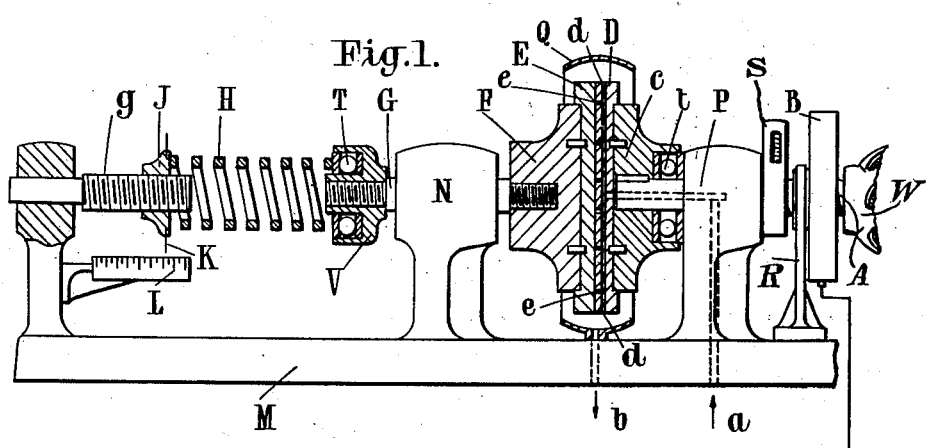
Fig. 1 represents the apparatus in elevation, partly in section.
Figure 2:
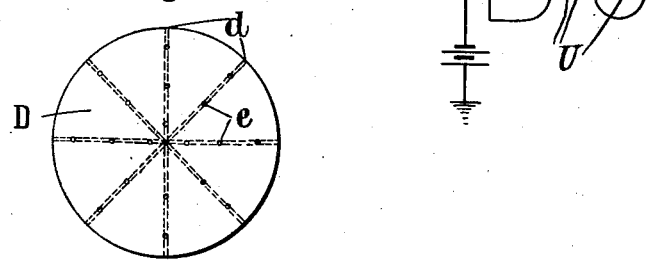
Fig. 2 represents in side elevation a disc provided with openings through which lubricant may be pumped.

The apparatus comprises a main shaft A which is coupled up to a driving motor and speed indicator (not shown) and is preferably connected to a pump for delivering lubricant to the surfaces to be tested. This shaft carries a stroboscopic instrument B, supported by a bracket R, for giving timed flashes for illuminating the discs to be investigated. This stroboscopic instrument preferably operates make and break contact devices in electric circuit through a suitable condenser and transformer device T with an electron discharge lamp U which causes flashes to illuminate the discs either synchronously with the driving disc or at a small difference in time period so that the latter appears either to be stationary or to be rotating at reduced speed.

The shaft A passes through a pillar P and carries a head C which drives a changeable driving test disc D and is provided with a thrust bearing *t*.

A driven disc E is similarly carried upon a head F mounted upon a shaft G supported in a pillar N. A second head V on this shaft carries a thrust-bearing T against which bears a spring H which is stressed by a head J engaging a screw *g*.

The pressure between the discs E, D is controlled by the strain of the spring H which is determined by the adjustment of the head J upon its screw. The head J is provided with a graduated index disc K which co-operates with a scale L to give readings of the pressure between the discs.

The discs D, E are removable and may be replaced by discs of other materials or in the case of testing dry surfaces they may be covered with various materials to be tested.

In order to test lubricated surfaces lubricant is pumped through a passage $a$ into an axial opening shown in dotted lines in the shaft A and thence to radial passages $d$ in the disc D which is provided with holes $e$ parallel to the axis of the disc through which the lubricant emerges so as to be applied at given pressure to the surfaces under test. An annular shield Q is provided to receive the lubricant thrown out from the rotating discs and a drain $b$ is provided from the shield. The shield is either of transparent material or is provided with windows to enable the edges of the discs to be viewed.

In the use of the apparatus the pressure between the surfaces under test is noted and the discs are viewed by the stroboscopic flashes; the speed of the motor is then increased until the discs thus viewed are seen to move relatively to each other, thus indicating that slip has occurred. From the readings of the speed indicator the speed at which slip occurs for the given pressure is thus obtained.

Alternatively of course the motor may be driven at constant speed and the pressure varied until slip is seen to occur or the power transmitted to the shaft may be measured by a suitable dynamometer or calculated from the electric power consumption of the motor.

The edges of the discs may be provided with index lines or other markings to assist in seeing the occurrence of slip.

The invention can be also applied to the testing of friction clutches to determine their limiting power transmission at various speeds.

It is to be understood that the words "Synchronous flashes" as used in this specification, while primarily intended to connote flashes which occur once per reciprocation or rotation of one of the surfaces, is intended to cover flashes which occur once in every two, three or other whole number of reciprocations or rotations.

I claim:—

1. A method of testing friction between the surfaces of moving bodies in contact which comprises moving one of the bodies whereby frictional engagement between said surfaces of the bodies causes synchronous movement of the other body, exerting an increased pressure upon the frictionally driven body until a slip occurs, rendering periodically visible the bodies by flashes timed in synchronism with one of the moving bodies for observation of the moment of slippage, and measuring the pressure at which the slip occurs.

2. A method of testing friction between surfaces of moving bodies in contact which comprises moving one of the bodies whereby frictional engagement between said surfaces of the bodies causes synchronous movement of the other body, forcing lubricant between the contacting surfaces and exerting an increased pressure upon the frictionally driven body at a given speed, rendering periodically visible the bodies by flashes for observing the moment of slippage, and measuring the pressure at which the slippage occurs.

3. An apparatus for testing friction between the surfaces of bodies comprising a driving body, a body having a surface in frictional contact with the surface of the driving body, means exerting a resistance on the driven body to cause slippage of said driven body, and stroboscopic illuminating means for detecting relative movement between said bodies, said stroboscopic means being flashed at a frequency bearing a known relation to the frequency of one of the moving bodies, and means for measuring the pressure at which the frictionally engaged surfaces cause slippage of one of the bodies.

4. An apparatus for testing friction between the surfaces of bodies comprising a driving disc and a disc frictionally driven by said driving disc, a prime mover provided with speed determining means for operating the driving disc, the driven disc being provided with means for applying a known pressure between surfaces and stroboscopic illuminating means for detecting relative movement between said bodies, said stroboscopic means being flashed at a frequency bearing a known relation to the frequency of one of the moving bodies, and means for measuring the pressure at which the frictionally engaged surfaces cause slippage of one of the bodies.

In testimony whereof I affix my signature.

ARTHUR JOHN HAWES ELVERSON.